UNITED STATES PATENT OFFICE.

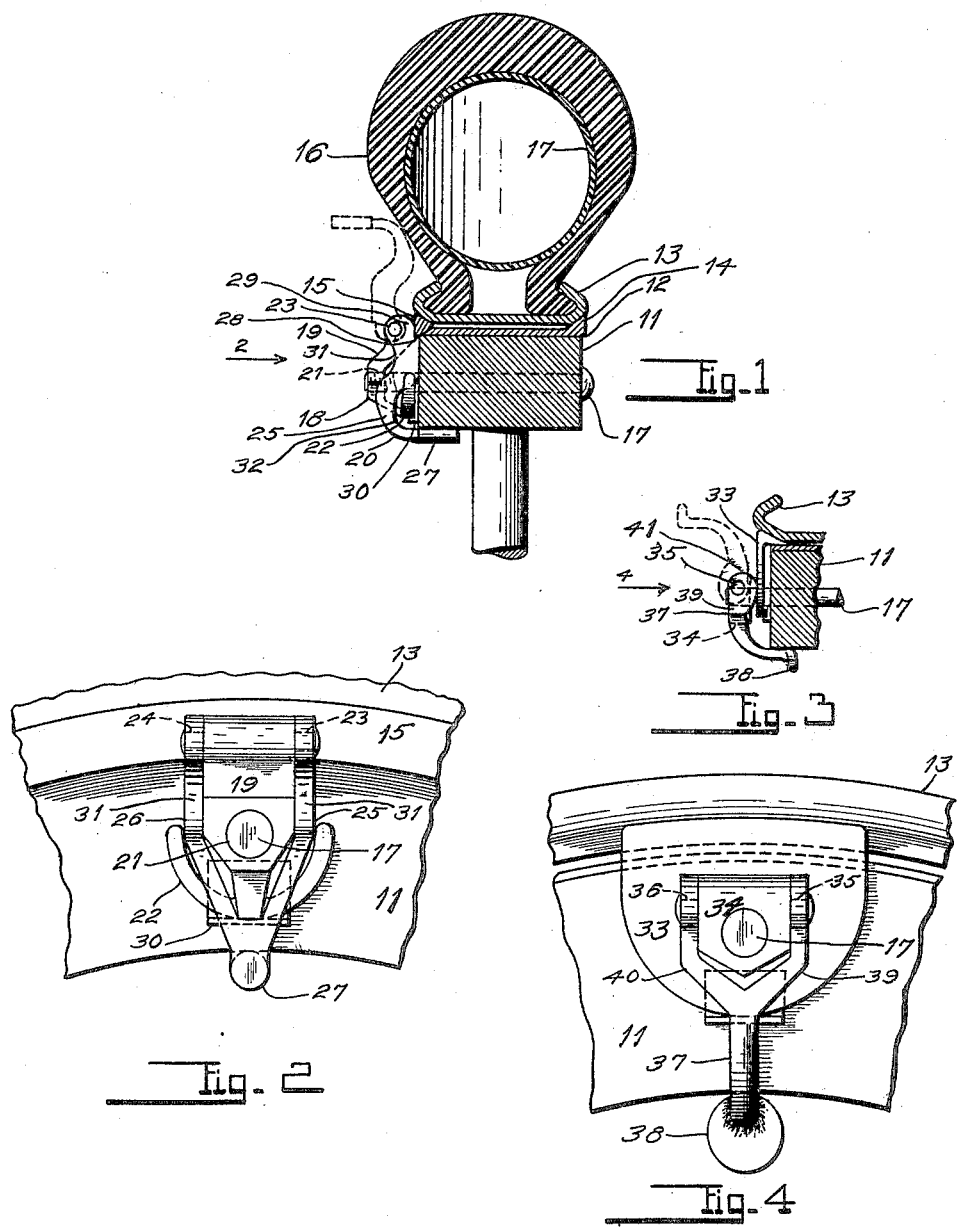

WILLIAM F. JOHNSON, OF BALTIMORE, MARYLAND.

SELF-LOCKING RETAINING-NUT.

1,400,879.　　　　Specification of Letters Patent.　　Patented Dec. 20, 1921.

Application filed January 23, 1920. Serial No. 353,440.

*To all whom it may concern:*

Be it known that I, WILLIAM F. JOHNSON, a citizen of the United States, residing at Baltimore, in the State of Maryland, have invented certain new and useful Improvements in Self-Locking Retaining-Nuts; and I do hereby declare the following to be a full, clear, and exact description of the invention, such as will enable others skilled in the art to which it appertains to make and use the same.

My invention relates to self-locking retaining nuts for demountable rims.

Among the objects of my invention are:—

To provide a nut carrying a handle, pivotally mounted thereon, by means of which the nut is applied or removed, thus eliminating the use of tools.

To provide a nut carrying a handle, pivotally mounted thereon, by means of which the nut is securely locked in position after it is tightened, thus preventing the loosening of said nut through vibration.

To provide a simple, cheap and effective nut, of the character described, which can be applied to structures now in use, without necessitating any change in said structures.

In the drawings:—

Figure 1 is a section of the felly of a wheel, provided with a demountable rim and pneumatic tire, and showing my improved nut in its locked position.

Fig. 2 is an enlarged view of my improved nut, looking in the direction of the arrow 2 in Fig. 1.

Fig. 3 is a view of another form of my improved nut. This view is similar to Fig. 1, excepting that the tire and part of the felly is omitted.

Fig. 4 is an enlarged view looking in the direction of the arrow 4 in Fig. 3.

In the drawings:—

11 is the felly of a wheel, having secured on its periphery, the rim 12. The demountable rim 13 bears upon the raised inner edge 14 of the rim 12 and upon the retaining ring 15, and carries in the usual manner the casing 16 and inner tubing 17.

The felly 11 is provided with a plurality of holes and bolts such as 17 are inserted in said holes. Said bolts project beyond the left side of the felly 11, as shown in Fig. 1. Upon the threaded end of the bolt 17 is screwed my improved nut 18.

Said nut consists of two parts, the body 19 and the handle 20. The body of said nut is shaped as shown in Figs. 1 and 2, and is provided with a threaded hole 21 for the reception of the threaded end of the bolt 17, with a portion 22, coaxial with the hole 21 for a purpose hereinafter explained and at its opposite end with the pintles 23 and 24, formed integrally with said nut, as shown in Fig. 2.

The handle 20 is pivotally mounted upon the pintles 23 and 24, and is Y-shaped, the branches 25 and 26 merging into the grip 27, as shown in Figs. 1 and 2. Said handle is further provided with notches 28—28 and with a cam shaped portion on each branch of said Y, similar to the cam shaped portion shown at 29 in Fig. 1.

Plates such as 30 are placed on the felly of the wheel under each bolt for a purpose hereinafter explained.

The operation of my improved nut is as follows:

Fig. 1, by full lines, and Fig. 2 show my improved nut in locked position. To remove the nut, the locking handle 20 is moved to the position shown dotted in Fig. 1, in which position the handle is used to unscrew the body 19 from the bolt by applying the hand to the grip 27. When all the nuts have been removed in this manner, the ring 15 may be removed and the demountable rim may then be taken from the felly.

After a new rim 13 has been placed on the wheel and the ring 15 applied in the usual manner, the body 19 is screwed on the bolt 17 by means of the handle 20, which is in the position with reference to said body shown dotted in Fig. 1, until the inner face of the portion 22 or the inner surface of the nut adjacent the pintles 23 and 24 bears hard against the ring 15. The bolt 17 is so placed in the felly that the body 19, when thus tightened, will be in the position shown in Figs. 1 and 2.

The handle 20 is then swung down to the position shown in full lines in Figs. 1 and 2, the grip 27 resting snug against the inner side of the felly 11. During the motion of the handle just explained, the cam portions 29—29 will bear against the ring 15 and force said ring firmly against the rim 13, thus securing the latter in place, and the portion 22 will be forced against the plate 30, thus forming a support to prevent bending of the bolt 17. At the same time, the notches 28—28 will embrace the edge of the ring 15, and their contact therewith together with the contact of the grip 27 against the inner surface of the felly will effectually prevent turning of my improved nut. It is to be noted that the recesses 31—31 in the branches 25 and 26 of the handle are provided for clearance around the rim 13 during the operation of the screwing up of my improved nut. The recess at 32 is to provide clearance around the portion 22.

Figs. 3 and 4 show a variation in construction of my improved nut, as applied to wheels provided with lugs instead of retaining rings. Lugs such as 33 are provided to slip over the bolt 17 and bear the same relation to the demountable rim 13, as does the retaining ring 15, shown in Figs. 1 and 2. A nut 24 screwed on the bolt 17 carries the pintles 35 and 36, on which is pivotally mounted the locking handle 37, provided with the grip 38 and the branches 39 and 40. The operation of this style of nut is the same as for that hereinbefore described excepting that the notches 28—28 of the first form of handle are omitted and the equivalent of the cam shaped portion 29 in said handle is shown at 41 in Fig. 3.

I claim:—

1. The combination with a felly, a rim, means on said felly for securing one side of said rim, a ring, and bolts through said felly, of nuts on said bolts, each nut comprising a body screwed on said bolt, a handle pivoted to said body, and a grip on said handle contacting with said felly to lock said body.

2. The combination with a felly, a rim, means on said felly for securing one side of said rim, a ring, and bolts through said felly, of nuts on said bolts, each nut comprising a body screwed on said bolt, a handle pivoted to said body, a plate on said felly and a portion on said nut contacting with said plate to prevent bending of said bolt.

3. The combination with a felly, a rim, means on said felly for securing one side of said rim, a ring, and bolts through said felly, of nuts on said bolts, each nut comprising a body screwed on said bolt, a handle pivoted to said body, and notches in said handle contacting with said ring to lock said body.

4. The combination with a felly, a rim, means on said felly for securing one side of said rim, a ring, and bolts through said felly, of nuts on said bolts, each nut comprising a body screwed on said bolt, a handle pivoted to said body, and cams on said handle contacting with said ring to force it against said rim.

5. The combination with a felly, a rim, means on said felly for securing one side of said rim, clamping means for securing the other side of said rim and bolts through said felly, of nuts on said bolts, each nut comprising a body screwed on said bolt, a handle pivoted to said body and cams for forcing said clamping means against said rims.

6. The combination with a felly, a rim, means on said felly for securing one side of said rim, clamping means for securing the other side of said rim and bolts through said felly, of nuts on said bolts, each nut comprising a body screwed on said bolt, a handle pivoted to said body and means on said handle for locking said body.

7. The combination with a felly, a rim, means on said felly for securing one side of said rim, clamping means for securing the other side of said rim and bolts through said felly, of nuts on said bolts, each nut comprising a body screwed on said bolt, a handle pivoted to said body and recesses in said handle to clear said rim.

In testimony whereof, I affix my signature.

WILLIAM F. JOHNSON.